United States Patent
Hanafusa et al.

(10) Patent No.: US 7,108,089 B2
(45) Date of Patent: Sep. 19, 2006

(54) WALK-BEHIND SELF-PROPELLED WORKING MACHINE

(75) Inventors: Jitsumi Hanafusa, Wako (JP); Kenji Kuroiwa, Wako (JP)

(73) Assignee: Honda Motor Co., Ltd., (JP)

( * ) Notice: Subject to any disclaimer, the term of this patent is extended or adjusted under 35 U.S.C. 154(b) by 338 days.

(21) Appl. No.: 10/823,109

(22) Filed: Apr. 13, 2004

(65) Prior Publication Data

US 2004/0206557 A1    Oct. 21, 2004

(30) Foreign Application Priority Data

Apr. 17, 2003   (JP)   ............... 2003-112239

(51) Int. Cl.
*B60K 6/06*    (2006.01)
*E01H 5/09*    (2006.01)

(52) U.S. Cl. ............ 180/65.4; 180/19.1; 180/65.2; 37/246; 903/951

(58) Field of Classification Search ............ 180/65.2, 180/65.3, 65.4, 19.1; 903/951; 37/246
See application file for complete search history.

(56) References Cited

U.S. PATENT DOCUMENTS

| | | | |
|---|---|---|---|
| 3,960,231 A | 6/1976 | McCormick | 180/19 |
| 5,438,770 A * | 8/1995 | Miller | 37/227 |
| 6,453,583 B1 * | 9/2002 | Hanafusa et al. | 37/246 |
| 6,550,161 B1 * | 4/2003 | Hanafusa et al. | 37/246 |
| 6,662,477 B1 * | 12/2003 | Dowe et al. | 37/257 |
| 6,944,979 B1 * | 9/2005 | Hanafusa et al. | 37/260 |

FOREIGN PATENT DOCUMENTS

| | | | |
|---|---|---|---|
| DE | 1837331 | 9/1961 | |
| JP | 01161104 | 6/2001 | |
| JP | 02005054463 A * | 3/2005 | 37/246 |
| WO | 8901892 | 3/1989 | |

* cited by examiner

*Primary Examiner*—Jeff Restifo
(74) *Attorney, Agent, or Firm*—Adams & Wilks (57) ABSTRACT

A walk-behind self-propelled working machine includes an engine disposed with a crankshaft extending vertically in a downward direction and a cylinder disposed horizontally, and a generator having a drive shaft disposed vertically downward. The drive shaft of the generator and the crankshaft of the engine have respective axes that are disposed on a line perpendicular to an axis of the cylinder, as viewed in plan. The crankshaft and the drive shaft are connected together via a power transmitting mechanism.

3 Claims, 9 Drawing Sheets

FIG. 8A
(EMBODIMENT)

FIG. 8B
(COMPARATIVE EXAMPLE)

FIG. 9
(PRIOR ART)

WALK-BEHIND SELF-PROPELLED WORKING MACHINE

FIELD OF THE INVENTION

The present invention relates to a walk-behind self-propelled working machine having two different drive sources (e.g., an engine and an electric motor), one for driving a working unit the other for driving a traveling unit of the working machine.

BACKGROUND OF THE INVENTION

Walk-behind self-propelled working machines having two different drive sources are well known in the art and disclosed in, for example, Japanese Patent Laid-Open Publication No. 2001-161104.

Figure 9:
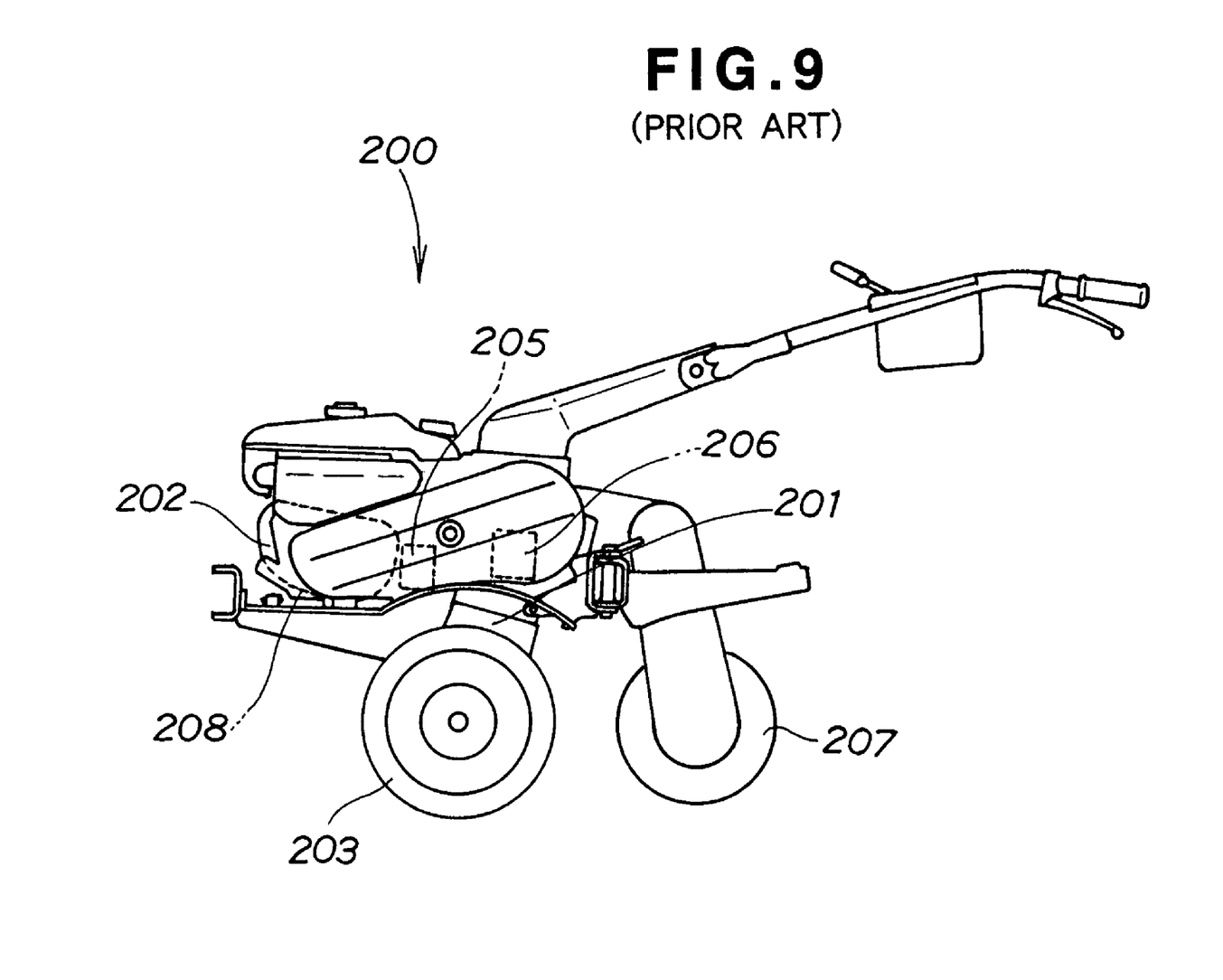
FIG. 9 is a side elevation view of a conventional walk-behind self-propelled working machine.

FIG. 9 hereof shows, in side elevation, the walk-behind self-propelled working machine disclosed in the above publication.

The working machine designated generally at 200 includes a machine body 201, an engine 202 mounted on the body 201, a generator 205 having a drive shaft, an electric motor 206, traveling wheels 203, and a rotary working member 207. The engine 202 has an output shaft operatively connected to the wheels 203 to rotate the same for propelling the machine 200. The output shaft of the engine is also operatively connected to the drive shaft of the generator 205 for driving the generator 205. The generator 205 then generates and supplies an electric power to the electric motor 206. The electric motor 206 thus supplied with the electric power drives the working member 207 for performing a work. The working machine 200 can thus travel while performing the work.

Known engines for walk-behind working machines of the same type as the above have a cylinder disposed vertically and upward, and a crankshaft disposed horizontally. The crankshaft projects from an engine body in a rearward direction of the machine body. The crankshaft has a driving pulley mounted thereon. Known generators used with the engine have a drive shaft having a driven pulley mounted thereon. The driving pulley and driven pulley are connected by a drive belt.

When the engine is driven to rotate the crankshaft, the driving pulley is rotated by the rotating crankshaft. The rotation of the driving pulley causes the drive belt to rotate the driven pulley. The driven pulley then rotates the drive shaft of the generator for driving the generator.

For transmission of rotation of the crankshaft of the engine to the drive shaft of the generator through the drive belt, the drive shaft of the generator is preferably disposed in parallel to the crankshaft of the engine. For this reason, the generator is usually disposed in a horizontal position.

The generator is required to generate a large amount of electric power for driving an electric motor to drive a rotary working member. Thus, the generator generates a large amount of heat.

To release the large amount of heat generated from the generator with high efficiency, it is preferred that the generator be arranged in the same direction as the flow of air surrounding the generator. However, the horizontal disposition of the generator is difficult to achieve the highly efficient releasing of the large amount of heat generated by the generator.

The crankshaft extends horizontally and rearward of the machine body, and is positioned above the bottom of the engine. The generator is also positioned above the bottom of the engine with the drive shaft disposed in parallel to the crankshaft. Because the generator is disposed above the bottom of the engine, the center of gravity of the working machine is undesirably positioned less low.

The generator is positioned rearward of the engine. Thus, the overall length of the working machine having the thus arranged generator is undesirably larger. The working machine of such a large overall length is not rendered compact.

SUMMARY OF THE INVENTION

An object of the present invention is to provide a walk-behind working machine having a generator which is disposed to improve heat releasing efficiency of the generator, can lower the center of gravity of the working machine, and is able to reduce the overall length of the working machine.

According to one aspect of the present invention, there is provided a walk-behind self-propelled working machine comprising: a machine body; an engine disposed on the machine body and having an output shaft for providing a motive power; a generator having a drive shaft driven by the motive power to generate an electric power; power transmitting means for transmitting the motive power from the output shaft of the engine to the drive shaft of the generator; an electric motor driven by the electric power from the generator to produce a motive power; a traveling unit driven by the motive power from one of the engine and the electric motor to propel the working machine; a working unit driven by the motive power from the other of the engine and the electric motor for performing a work; the engine being vertically disposed with a cylinder disposed horizontally and the output shaft disposed vertically and downwardly; the generator being vertically disposed with the drive shaft disposed vertically and downwardly; and an axis of the drive shaft of the generator and an axis of the output shaft of the engine being disposed on a line extending perpendicularly to an axis of the cylinder as viewed in plan. Since the generator is oriented in the same direction as the direction of flow of air heated by heat generated by the generator, the heat can be efficiently or readily released from the generator.

The axis of the drive shaft of the generator and the axis of the output shaft of the engine are disposed on the line perpendicular to the axis of the cylinder, as viewed in plan. This arrangement allows the generator to be disposed away from the cylinder of relatively high temperature so that the heat of the cylinder does not affect the generator.

Preferably, the working unit is disposed forwardly of the output shaft of the engine, the cylinder is disposed rearwardly of the output shaft of the engine, and the axis of the cylinder is disposed substantially in vertical alignment with a lengthwise centerline of the machine body. This arrangement allows the generator to be disposed in a "dead space" defined on either lateral side of the machine body where substantially no components other than the generator are disposed. The term "dead space" as used herein refers to an empty space which is normally in no use. Since such a "dead space" is advantageously used for installation or placement of the generator, mounting members used for mounting of the generator can avail a high degree of design freedom and can be configured into a simple form.

Furthermore, the generator is disposed on lateral side of the engine rather than forward or rearward of the engine, and hence the working machine has a reduced overall length.

Preferably, the engine has a lower end surface and the generator has a lower end surface disposed substantially flush with the lower end surface of the engine.

Since the lower end surface of the generator is substantially flush with the lower end surface of the engine, it is possible to lower the center of gravity of the working machine, which leads to improved stability of the working machine.

BRIEF DESCRIPTION OF THE DRAWINGS

A certain preferred embodiment of the present invention will hereinafter be described in detail, by way of example only, with reference to the accompanying drawings, in which.

DETAILED DESCRIPTION OF THE PREFERRED EMBODIMENT

Figure 1:
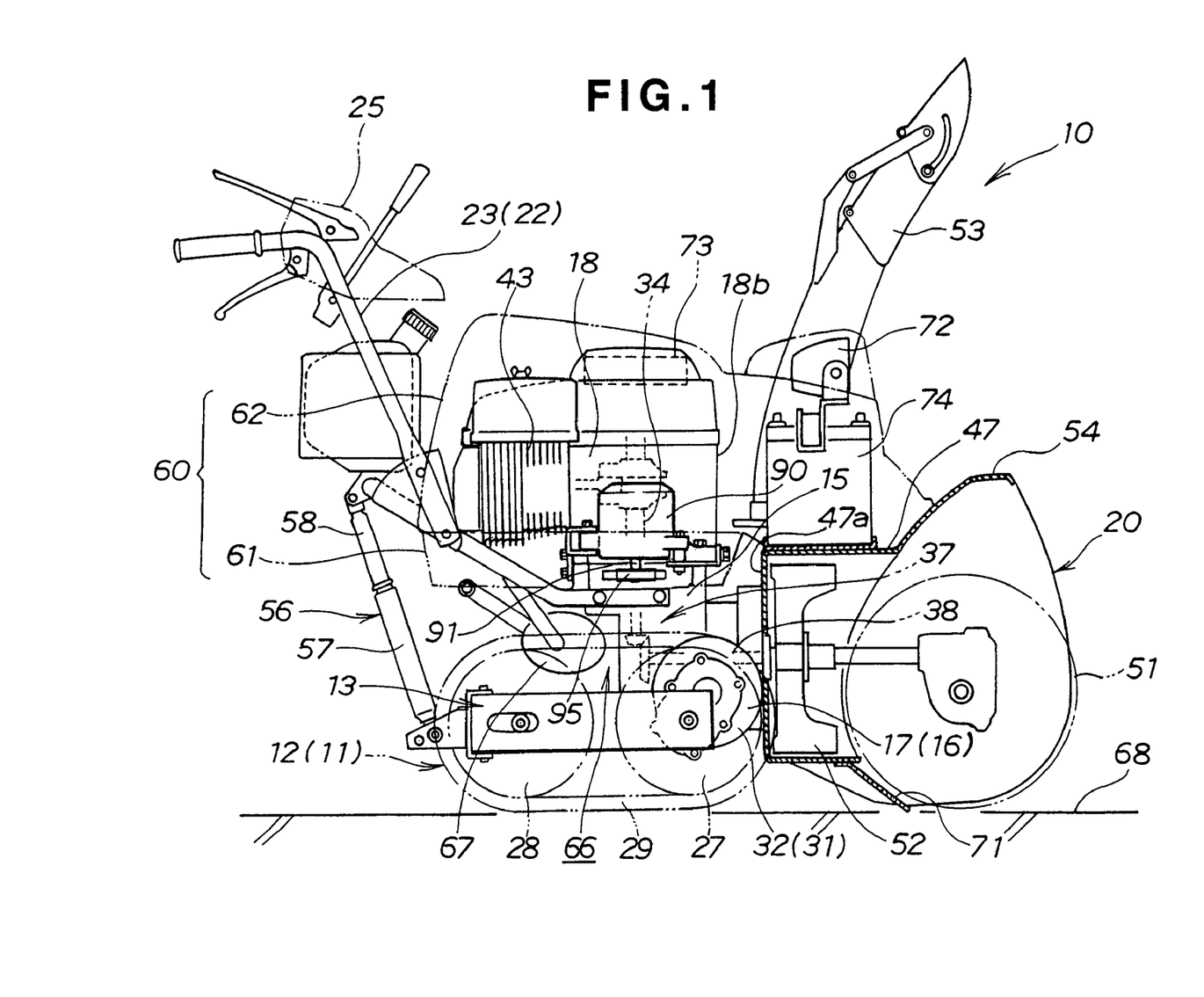
FIG. 1 is a side elevation view of a walk-behind self-propelled working machine according to the present invention.

Referring to FIG. 1, there is shown an exemplary walk-behind self-propelled working machine taking the form of a snow removing machine 10. The machine 10 includes a traveling frame 13 having left and right traveling units 11, 12 (see FIG. 2, too), a transmission case (a machine body) 15 mounted to the traveling frame 13 in such a manner as to swing in an up-and-down direction, left and right electric motors 16, 17 mounted to left and right sides of the transmission case 15, an engine 18 mounted on an upper part of the transmission case 15, a generator 90 mounted on the right side of the engine 18, a cover 60 attached to the transmission case 15 for covering the engine 18 and the generator 90, a snow-removing unit (working unit) 20 attached to a front part of the transmission case 15, left and right handlebars 22, 23 (see FIG. 2, too) extending rearward (more specifically, rearward and upward) from the upper part of the transmission case 15, and a control board 25 disposed between the handlebars 22, 23. The handlebars 22, 23 have hand grips at distal ends thereof. An operator can walk behind the snow removing machine 10, grasping the hand grips of the handlebars 22, 23.

The right traveling unit 12 includes a front driving wheel 27, a rear driven wheel 28 and a crawler belt 29 extending around the wheels 27, 28. The driving wheel 27 is driven by the right electric motor 17 for rotation in forward and reverse directions.

The left traveling unit 11 has the same arrangement as the right traveling unit 12. More specifically, the unit 11 includes a front driving wheel 27, a rear driven wheel 28 and a crawler belt 29 extending around the wheels 27, 28. The driving wheel 27 is driven by the left electric motor 16 for rotation in forward and reverse directions.

The left electric motor 16 serves as a drive source for the left traveling unit 11 and provides a motive power to the unit 11 via a left transmission mechanism 31. Similarly, the right electric motor 17 serves as a drive source for the right traveling unit 12 and provides a motive power to the unit 12 via a right transmission mechanism 32. The transmission mechanisms 31, 32 are hereinafter referred to as "traveling transmission mechanisms 31, 32"

The engine 18 serves as a drive source for the snow-removing unit 20 and provides a motive power to the unit 20 via a transmission mechanism 37 and a transmission shaft 38 accommodated within the transmission case 15. The transmission mechanism 37 is hereinafter referred to as "working transmission mechanism 37".

The engine 18 has a crankshaft (output shaft) 34 extending vertically and downwardly. The engine 18 has a cylinder portion 43 having a cylinder 42 defined therein, and a piston 41 reciprocally movably disposed within the cylinder 42 (see FIG. 3). The engine 18 has a front surface 18*b* disposed rearward of a rear surface 47*a* of (a blower housing 47) the snow-removing unit 20.

Figure 2:
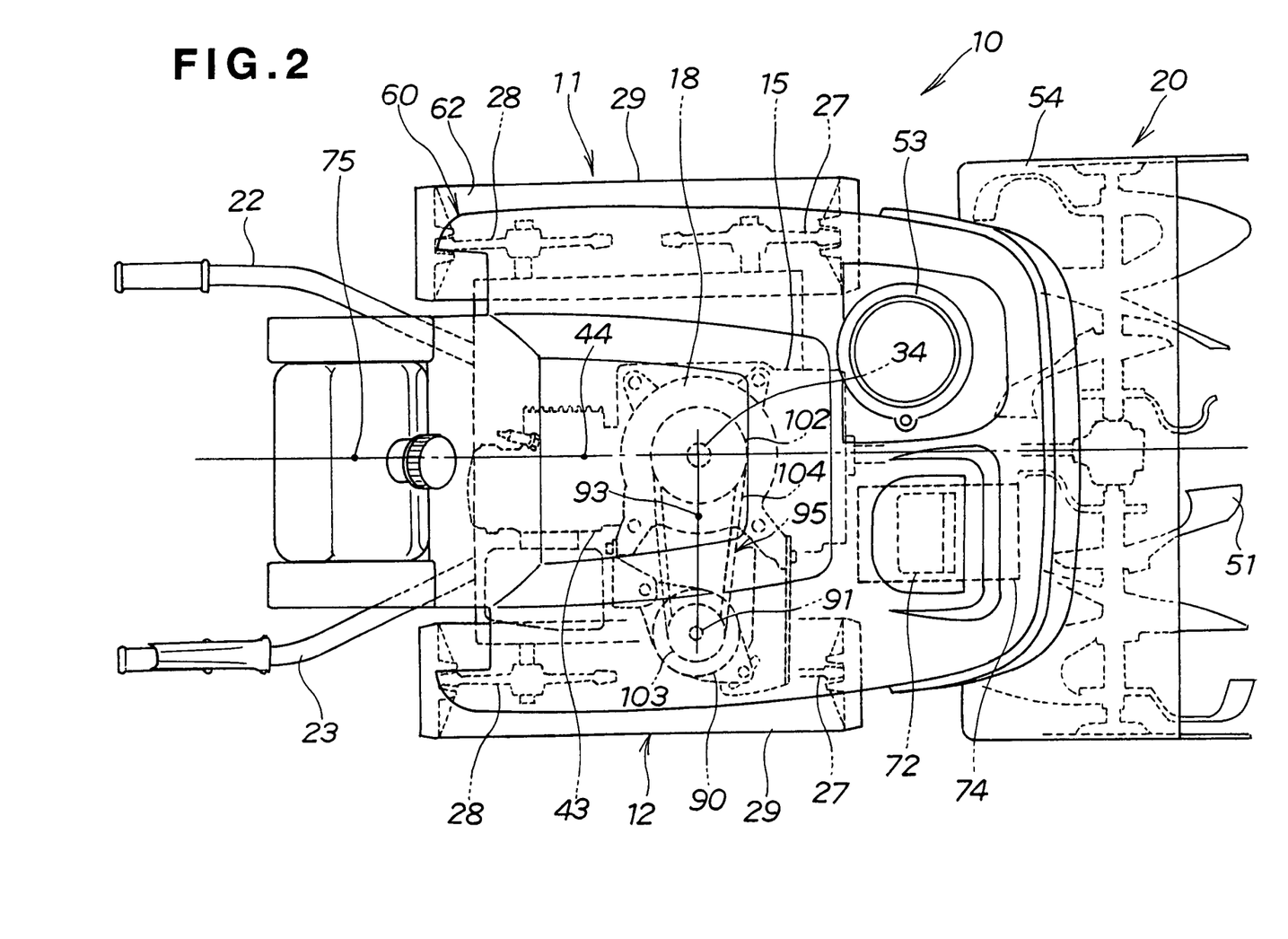
FIG. 2 is a top plan view of the working machine of FIG. 1 with a control board removed for clarity.
Figure 3:
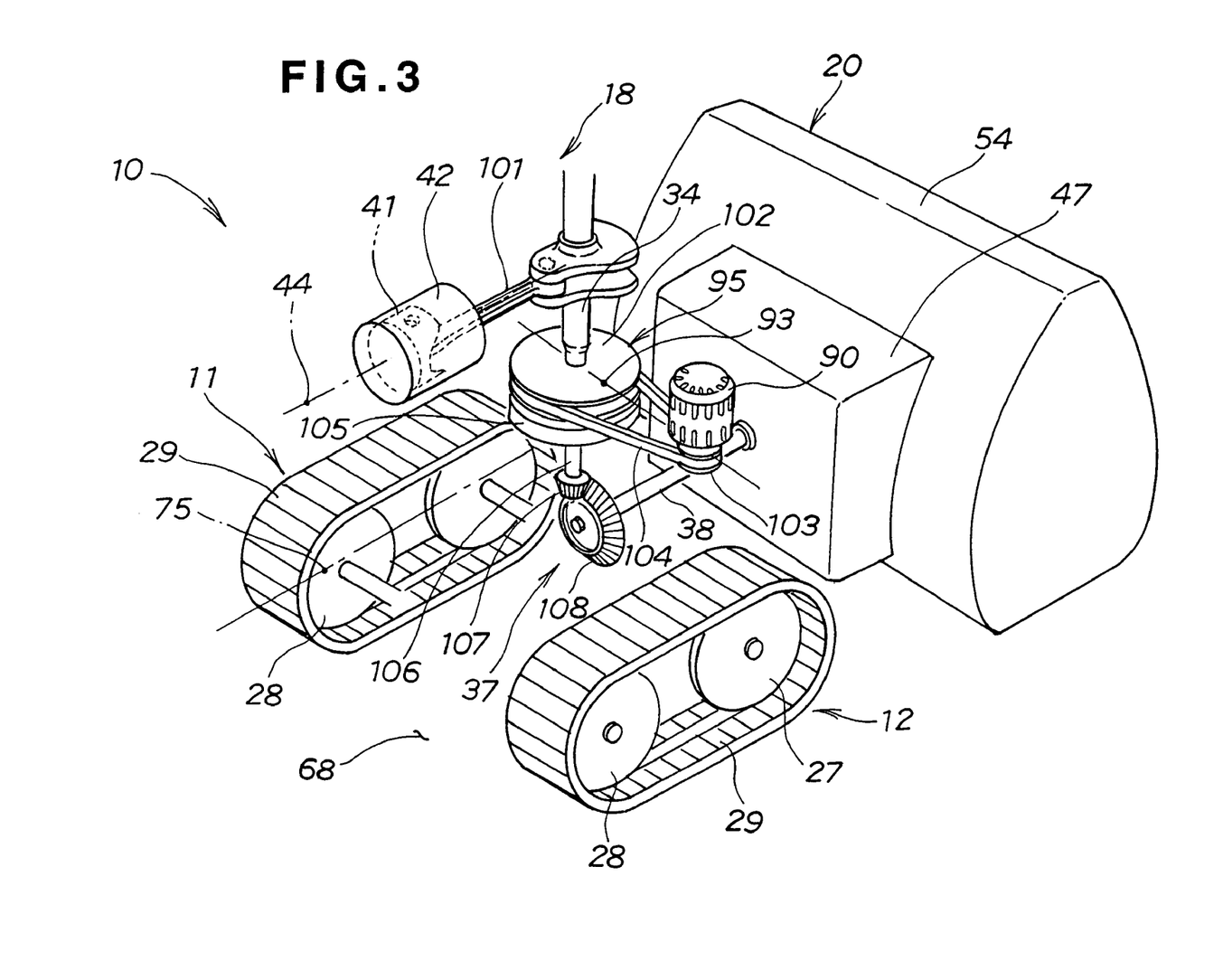
FIG. 3 is a schematic perspective view of the working machine with portions removed to show a positional relationship between an engine and a generator according to the present invention.

The generator 90 has a drive shaft 91 connected to the crankshaft 34 of the engine 18 through a power transmitting means 95 (see FIG. 2 and FIG. 3).

As will be discussed in detail below with reference to FIG. 3, while the snow-removing unit 20 is driven by a motive power transmitted via the working transmission mechanism 37 and the transmission shaft 38 from the crankshaft 34 to perform a snow removing operation, the generator 90 is driven by the motive power transmitted via the power transmitting means 95 from the crankshaft 34 to generate electric power for driving the electric motors 16, 17. The motors 16, 17 then drive the traveling units 11, 12 to propel the snow removing machine 10 on a ground surface 68.

Referring back to FIG. 1, the snow-removing unit 20 includes an auger 51, a blower 52 disposed behind and connected to the auger 51, a shooter 53 disposed above the auger 51 and the blower 52, an auger housing 54 covering the auger 51, and the blower housing 47 formed integrally with a rear part of the auger housing 54 and covering the blower 52. The auger 51 is operable to collect at the center thereof snow on the ground 68. The blower 52 is operable to blow the collected snow into the shooter 53. The snow is thrown out of the shooter 53 towards a desired position around the snow removing machine 10.

The snow removing machine 10 includes a swing mechanism 56 operable to swing the transmission case 15 in the up-and-down direction. The swing mechanism 56 comprises serves as an actuator such as an electric actuator, a hydraulic actuator, or a pneumatic actuator. The mechanism 56 includes a cylinder 57 and a rod 58 movable into and out of the cylinder 57 to swing the transmission case 15 up and down for adjusting a level at which the snow-removing unit 20 is to be positioned. The swing mechanism 56 is operable to prevent any swinging movement of the transmission case 15 once the snow-removing unit 20 is adjusted to a desired level.

The cover 60 is halved into a lower cover member 61 mounted to the upper part of the transmission case 15, and an upper cover member 62 mounted on the lower cover member 61. The lower and upper cover members 61, 62 jointly define a space 127 (see FIG. 6) for accommodating the engine 18 and the generator 90.

The engine 18 is disposed directly above the transmission case 15 with its cylinder portion 43 projecting rearward. The lower cover member 61 defines a space 66 therebelow (see FIG. 1).

Within the space 66, there is disposed a muffler 67 for discharging an exhaust gas coming from the engine 18. The muffler 67 is substantially entirely surrounded by the transmission case 15, the traveling frame 13, the swing mechanism 56, the left and right crawler belts 29, 29, the engine 18 and the ground surface 68.

Since the muffler 67 is thus surrounded in this manner, there is no fear that the operator directly touches or contacts the muffler 67 of relatively high temperature. Additionally, this allows the use of minimum size of a heat insulating plate to cover the muffler 67. The snow removing machine 10 further includes a scraper 71, a lamp 72 and an air cleaner 73.

As shown in FIG. 2, the engine 18 is disposed centrally of the snow removing machine 10. The machine body 15 has a central axis (hereinafter referred to as "body centerline") 75 extending in a front-and-rear direction thereof The crankshaft (output shaft) 34 has a center or axis disposed on the body centerline 75. The transmission case 15 is disposed directly below the engine 18 (see FIG. 1). The snow-removing unit 20 is disposed forwardly of the transmission case 15. The left and right crawler belts 29, 29 are disposed on the left and right sides of the transmission case 15, respectively. The driving wheel 27 and the electric motor 16 (or 17) are disposed on the front side of the crawler belt 29. The shooter 53, the lamp 72 and a battery 74 are disposed rearward of the auger housing 54. The shooter 53 is disposed on a left side of the body centerline 75 while the lamp 72 and the battery 74 are disposed on a right side of the body centerline 75.

Reference is made to FIG. 3. The crankshaft 34 of the engine 18 is disposed vertically and downwardly. The cylinder 42 has an axis 44 horizontally (i.e., in parallel to the ground surface 68). The generator 90 is vertically disposed with the drive shaft 91 disposed vertically and downwardly. The drive shaft 91 and the crankshaft 34 have their respective axes disposed on a line 93 perpendicular to the axis 44 of the cylinder 42 as viewed in plan (see FIG. 2 or FIG. 7). The crankshaft 34 is connected to the drive shaft 91 of the generator 90 through the power transmitting means 95.

The snow-removing unit 20 is disposed forwardly of the crankshaft 34. The cylinder 42 is disposed rearward of the crankshaft 34. The axis 44 of the cylinder 42 is disposed substantially on the body centerline 75, as viewed in plan (see FIG. 2 and FIG. 7).

The engine 18 has the piston 41 slidably disposed in the cylinder 42, and a connecting rod 101 connecting the piton 41 to the crankshaft 34.

The power transmitting means 95 has a driving pulley 102 mounted on the crankshaft 34, a driven pulley 103 mounted on the drive shaft 91 of the generator 90, and a drive belt 104 extending around the pulleys 102, 103.

The crankshaft 34 has a lower end portion 35 (see FIG. 6) connected through an electromagnetic clutch 105 to an upper end of a working output shaft 106. The working transmission mechanism 37 has a pinion 107 mounted to a lower end of the working output shaft 106, and a bevel gear 108 meshing with the pinion 107. The bevel gear 108 is mounted to a rear end of the transmission shaft 38.

When the engine 18 is running, rotation of the crankshaft 34 is transmitted through the power transmitting means 95 to the drive shaft 91 of the generator 90, thereby driving the generator 90. The thus driven generator 90 generates electric power for driving the left and right electric motors 16, 17 (see FIG. 1). The left and right electric motors 16, 17 then generate motive power for driving the left and right traveling units 11, 12 through the left and right traveling transmission mechanisms 31, 32, respectively, to propel the snow-removing machine 10 on the ground surface 68.

Meanwhile, the electromagnetic clutch 105, if placed in an ON state, transmits the rotation of the crankshaft 34 to the working output shaft 106. The working output shaft 106 then rotates the pinion 107 to thereby rotate the bevel gear 108. The rotation of the bevel gear 108 rotates the transmission shaft 38 for rotating the auger 51 and the blower 52 to perform the snow-collecting and snow-throwing operation as discussed above.

If the electromagnetic clutch 105 is in an OFF state, the crankshaft 34 is disconnected from the working output shaft 106 to thereby stop the rotation of the shaft 106.

Figure 4:
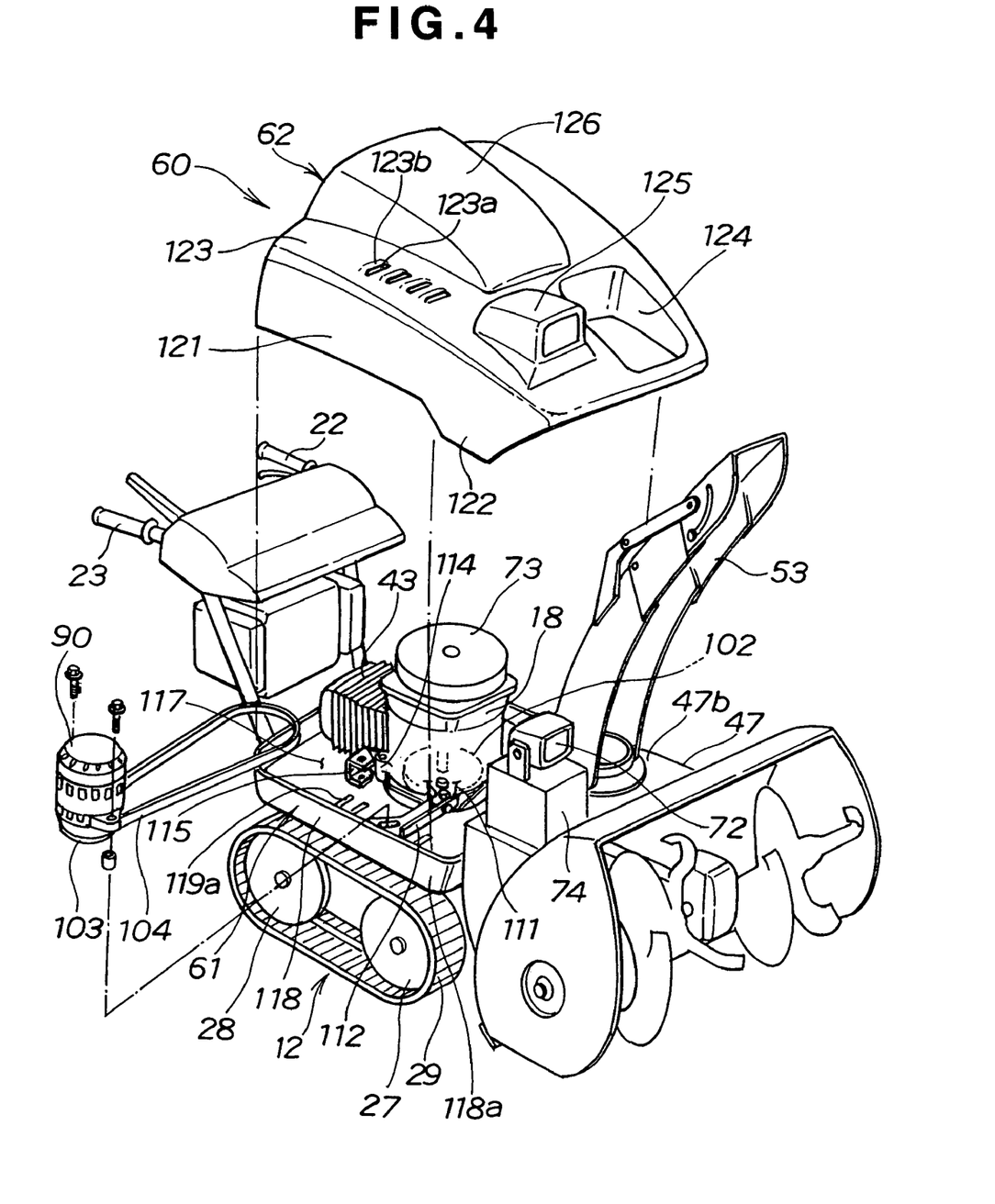
FIG. 4 is a perspective view of the working machine with generator detached and a cover halved.

Referring to FIG. 4, the engine 18 has a right front mounting portion 111 and a right rear mounting portion 114. The generator 90 is mounted to the right front mounting portion 111 and the right rear mounting portion 114 of the engine 18 via front and rear mounting brackets 112, 115, respectively.

The upper cover member 62 is mounted on the lower cover member 61 to cover the engine 18, the air cleaner 73 and the generator 90. The cover 60 thus protects the generator 90 from snowstorm or water resulting from thawing of snow to thereby provide a prolonged life of the generator 90.

Figure 6:
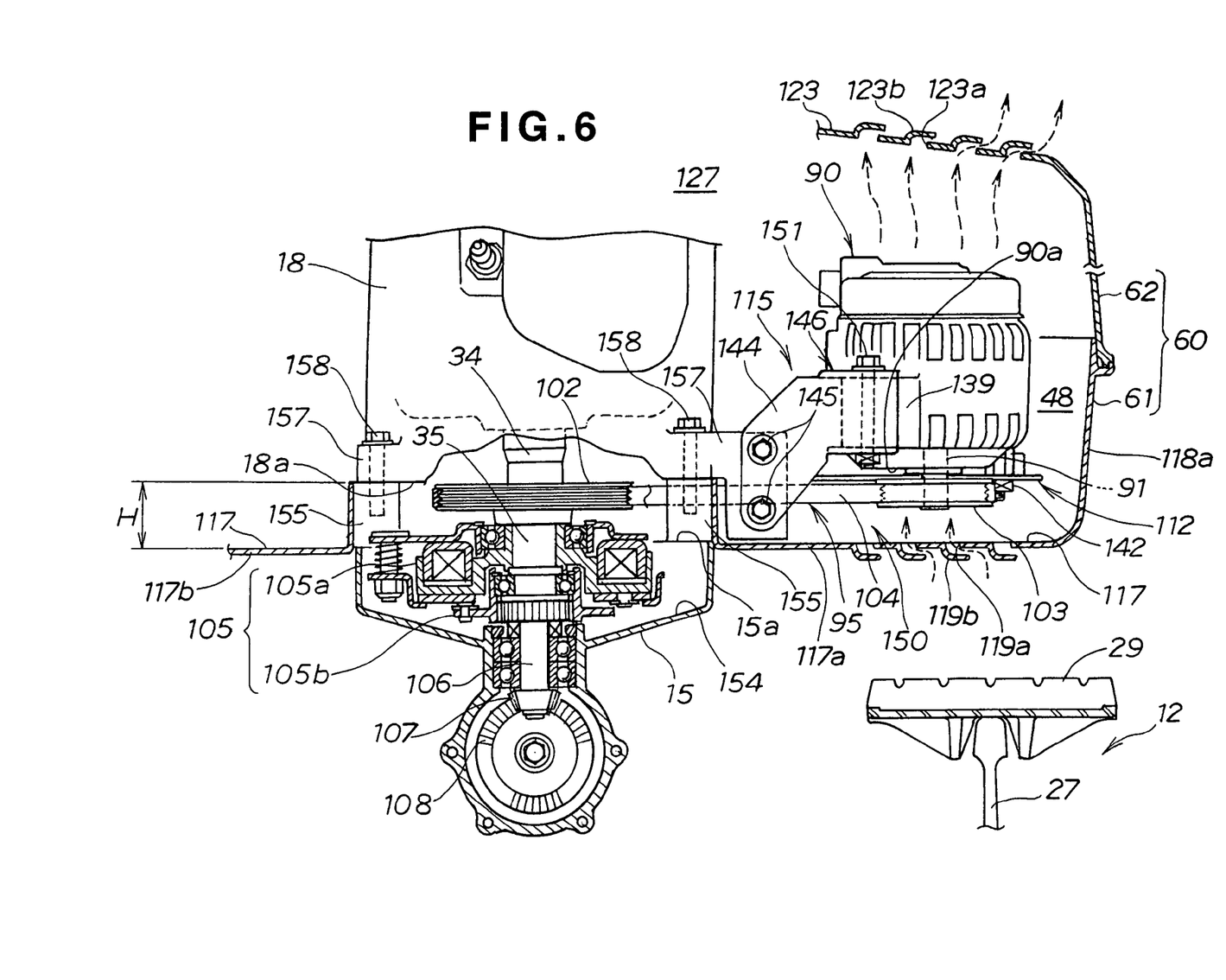
FIG. 6 is a cross-sectional view of the machine body, the engine mounted on the machine body, and the cover mounted to the machine body with the generator disposed in the cover on the right side of the engine.

As shown in FIG. 2 and FIG. 6, the generator 90 is disposed in a space defined above the crawler belt 29 of the right traveling unit 12. Such a space defined above the right crawler belt 29 is suitable for installation or placement of the generator 90 because the space is a substantially "dead space" where few components or members other than the generator 90 are disposed. As to the "dead space" used for the installation of the generator 90, detailed description will be made later.

Referring to FIG. 4 and FIG. 6, the lower cover member 61 is of generally rectangular configuration and has a bottom wall 117 mounted to the machine body 15 (see FIG. 6), and a peripheral wall 118 protruding upwardly from the entire peripheral edge of the bottom wall 117. The bottom wall 117 has a right bottom portion 117a disposed above the crawler belt 29 of the right traveling unit 12, and a left bottom portion 117b. It is to be noted that the bottom portion 117b is disposed above the crawler belt 29 of the left traveling unit 11. The peripheral wall 118 has a right side portion 118a spaced rightward from the engine 18 and disposed above the crawler belt 29 of the right traveling unit 12. Though not shown, the peripheral wall 118 has a left side portion spaced leftward from the engine 18 and disposed above the crawler belt 29 of the left traveling unit 12.

Figure 7:
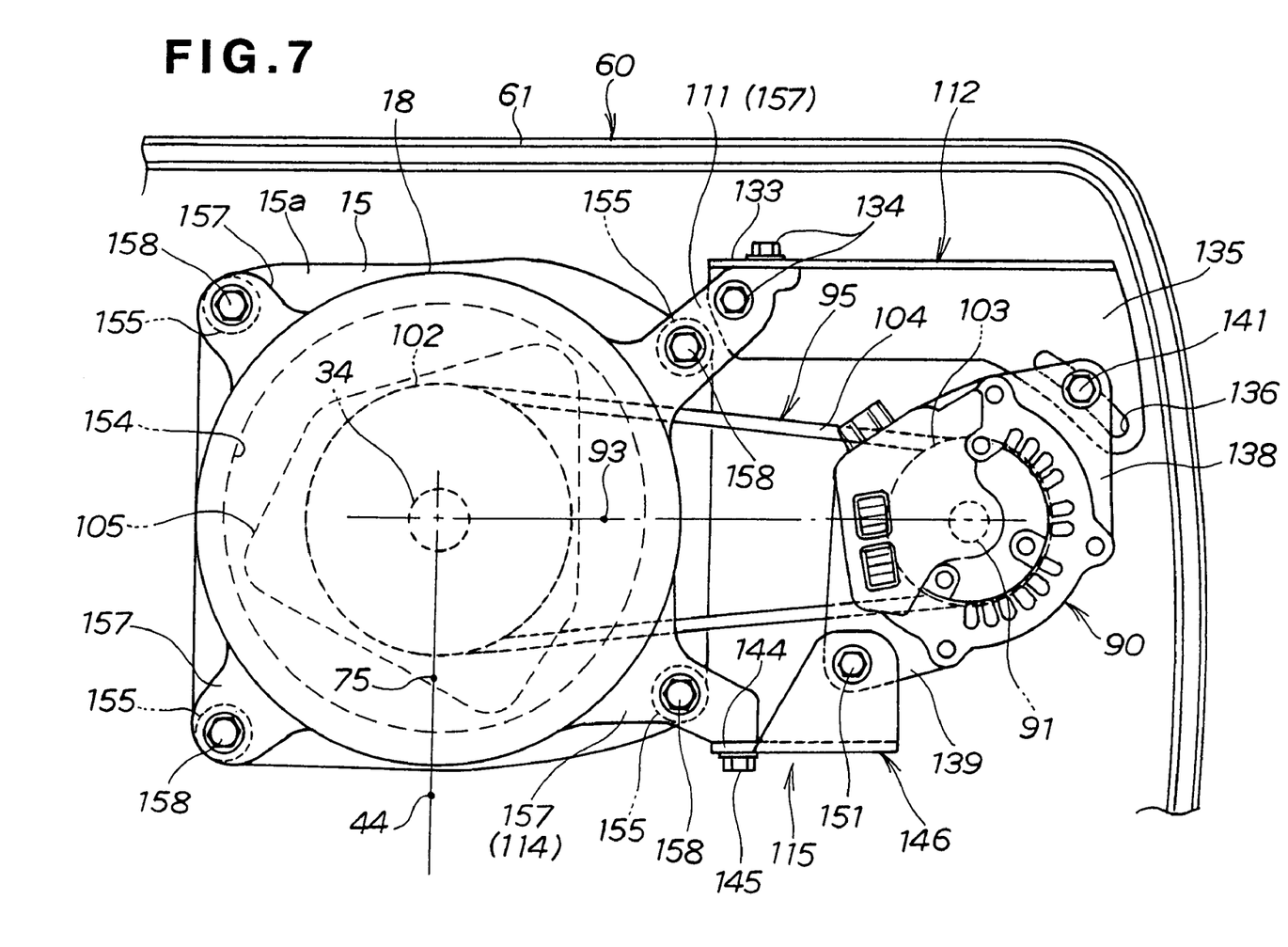
FIG. 7 is a top plan view showing the engine, the generator and the machine body of FIG. 6.

As shown in FIG. 2 and FIG. 7, the axis of the drive shaft 91 of the generator 90 and the axis of the crankshaft 34 are disposed on the line 93 perpendicular to the axis 44 of the cylinder 42, as viewed in plan. This arrangement makes it possible for the generator 90 to be disposed away from the cylinder 42 of the cylinder portion 43 which is a heat-generating part or heat source having a relatively high temperature. Thus, the generator 90 is not affected by the heat of the cylinder 42 and hence has a prolonged service life.

As shown in FIG. 3, the cylinder 42 of the cylinder portion 43 is disposed rearward of the crankshaft 34 and the axis 44 of the cylinder 42 is disposed in a vertical alignment with the body centerline 75. In other words, the axis 44 and the body centerline 75 are disposed in the same vertical plane. This arrangement makes it possible for the generator 90 to be disposed in a space 48 (see FIG. 6) defined by the engine 18, the right bottom portion 117a of the bottom wall 117 and the right side portion 118a of the peripheral wall 118. The space 48 is a substantially "dead space" where few components other than the generator 90 are disposed.

Since the generator 90 is disposed in the substantially "dead space" 48, the mounting brackets 112, 115 used for mounting the generator 90 to the engine 18 can be avail a higher degree of design freedom and can be configured into a simple form. Further, because the generator 90 is disposed on the right side of the engine 18 rather than rearward or forward of the engine 18, as best shown in FIG. 2, the snow-removing machine 10 has a relatively small overall length.

Referring back to FIG. 4, the upper cover member 62 includes a top wall 123 and a peripheral wall extending downwardly along rear, left and right side edges of the top wall 123. The peripheral wall has on left and right sides thereof rear peripheral wall portions (only right side one shown) 121 mounted on the left and right side portions of the peripheral wall 118 of the lower cover member 61, respectively, and a front peripheral wall portion 122 cooperating with the auger housing 54 for surrounding a top surface 47b of the blower housing 47. The top wall 123 has its front part having a front opening 124 formed at a left side thereof and sized to allow the shooter 53 to fit there-through, and a raised portion 125 disposed at a right side of the front opening 124 for covering the lamp 72. The top wall 123 also has a raised portion 126 formed centrally thereof and disposed rearward of the front opening 124 and the raised portion 125 for covering the air cleaner 73 and an upper part of the engine 18.

The upper cover member 62 mounted to the lower cover member 61 defines a space above the top surface 47b of the blower housing 47 for accommodating the battery 74 and the lamp 72.

Figure 5:
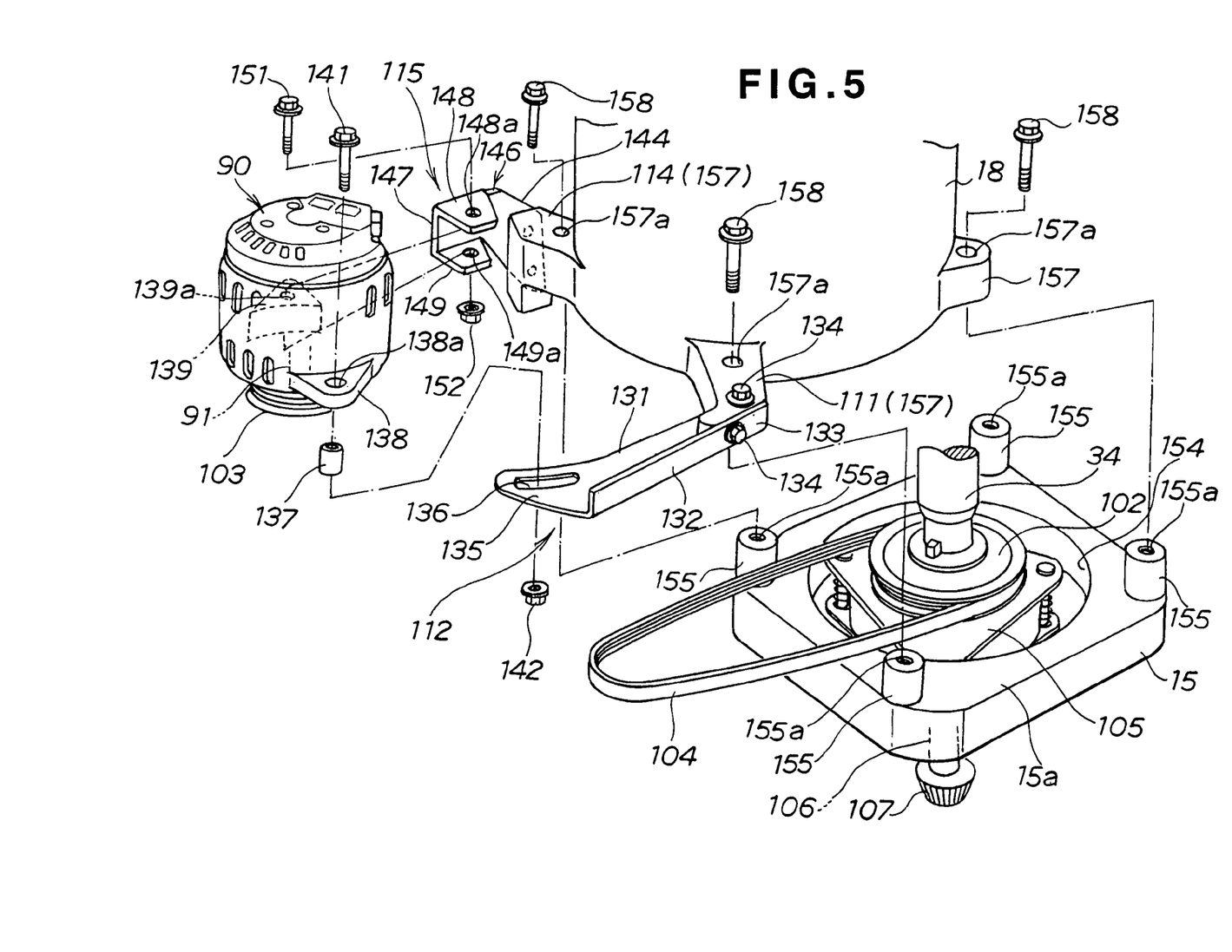
FIG. 5 is a perspective view of the generator and a machine body with the engine detached.

As shown in FIG. 5, the front mounting bracket 112 extends rightward from the right front mounting portion 111 of the engine 18. The bracket 112 has an L-shaped cross-section and has a horizontal plate 131 and a vertical plate 132 extending along and rising upwardly from a longitudinal edge of the plate 131. The front mounting bracket 112 has a base portion 133 attached to the right front mounting portion 111 of the engine 18 by a pair of bolts 134, 134. The horizontal plate 131 has a distal end portion 135 projecting from the vertical plate 132 towards the generator 90. The projecting portion 135 has a guide opening 136 of arcuate elongated configuration.

The generator 90 has a front mount flange 138 attached by a bolt 141 to an end portion of the projecting portion 135 of the front mounting bracket 112 with a cylindrical spacer 137 disposed between the mount flange 138 and the projecting portion 135. The bolt 141 extends successively through a mounting hole 138a of the mount flange 138, an axial hole of the spacer 137 and the guide opening 136 of the front mounting bracket 112 and is fastened to a nut 142.

The rear mounting bracket 115 has a base portion 144 attached to the right rear mounting portion 114 of the engine 18 by a pair of bolts 145, 145 (see FIG. 6), and a retaining portion 146 projecting rightward from the base portion 144. The retaining portion 146 has a U-shaped cross-section and includes a vertical wall 147, and upper and lower horizontal wings 148, 149 projecting forwardly from the vertical wall 147. The upper and lower horizontal wings 148, 149 have mounting holes 148a, 149a, respectively.

The generator 90 has a rear mount flange 139 is received between the upper and lower wings 148, 149 of the retaining portion 146 and is attached by a bolt 151 to the retaining portion 146 of the rear mounting bracket 115. The bolt 151 extends successively through a hole 148a of the upper wing 148, a mounting hole 139a of the mount flange 139, and a hole 149a of the lower wing 149 and is fastened to a nut 152.

The upper part of the machine body (the transmission case) 15 has formed therein an upwardly opened space 154 (see FIG. 6, too) for accommodating the electromagnetic clutch 105 therein. The upper machine body part has a quadrangular configuration and includes four mounting bosses 155 disposed on an upper surface 15a thereof adjacent respective corners of the quadrangular upper machine body part.

The engine 18 has four mount flanges 157 (three of which are shown in FIG. 5) corresponding in position to the four mounting bosses 155 of the machine body 15. Each mount flange 157 has a mounting hole 157a aligned with a threaded hole 155a of the corresponding mounting boss 155. Two of the four mount flanges 157 serve as the right front mounting portion 111 and the right rear mounting portion 114 of the engine 18, respectively. The four mount flanges 157 are secured to the mounting bosses 155 by four bolts 158 each screwed through the mounting hole 157a into the corresponding threaded hole 155a. The engine 18 is thus mounted on the four mounting bosses 155.

It is to be noted that the right front mounting portion 111 of the engine 18 to which the front mounting bracket 112 is mounted is not limited in configuration to the illustrated one. Similarly, the configuration of the right rear mounting portion 114 of the engine 18 to which the rear mounting bracket 115 is mounted is not limited to the one shown in the illustrated embodiment.

As shown in FIG. 6, the lower cover member 61 of the cover 60 is mounted to the upper part of the machine body 15. Each mount flange 157 of the engine 18 is attached to the corresponding mounting boss 155 of the machine body 15 by the bolt 158. The electromagnetic clutch 105 has an input side 105a connected to the lower end portion 35 of the crankshaft 34, and an output side 105b connected to the working output shaft 106.

With the respective mount flanges 157 of the engine 18 mounted on the corresponding mounting bosses 155 of the machine body 15, the engine 18 has a lower end surface 18a positioned a distance H above the upper surface 15a of the upper machine body part. Likewise, the generator 90 has a lower end surface 90a disposed substantially the distance H above the right bottom portion 117a of the bottom wall 117 of the lower cover member 61. The upper surface 15a of the upper machine body part and the right bottom portion 117a of the lower cover member 61 lie substantially flush with each other. Thus, there is defined a space 150 between the upper surface 15a and the lower end surface 18a, and between the right bottom portion 117a and the lower end surface 90a. The space 150 is used for accommodation of the power transmitting means 95 (including the driving pulley 102, the driven pulley 103 and the drive belt 104).

Because the generator 90 is spaced upwardly from the right bottom portion 117a of the bottom wall 117 of the lower cover member 61, heat emitted from the generator 90 does not affect the lower cover member 61 of the cover 60.

The generator 90 has an upper end surface (not designated) spaced from the top wall 123 of the upper cover member 62 by a given distance to thereby define a space therebetween, as is apparent from FIG. 6. With the space thus defined between the upper end surface of the generator 90 and the top wall 123, heat emitted from the generator 90 does not affect the upper cover member 62.

The right bottom portion 117a of the bottom wall 117 of the lower cover member 61 of the cover 60 has formed therein lower vent-holes 119a located below the generator 90 for taking in air from outside the cover 60 to cool the generator 90, as shown by arrows. The lower vent-holes 119a may have any configuration provided that they can perform the above described function of introducing outside air into the inside of the cover 60.

The top wall 123 of the upper cover member 62 of the cover 60 has formed therein upper vent-holes 123a located above the generator 90 for discharging out heat generated by the generator 90 as the outside air having been used to cool the generator 90 flows out from the cover 60 through the upper vent-holes 123a. The upper vent-holes 123a may have any configuration provided that they can perform the above described function of discharging out of the cover 60 the heat of the generator 90 as the outside air flows out of the cover 60 through the vent-holes 123a.

The right bottom portion 117a has lower guard plates 119b disposed directly below the lower vent-holes 119a for preventing snow splashed up by the right crawler belt 29 during the propulsion of the snow removing machine 10 from entering the inside of the cover 60 through the vent-holes 119a. The lower guard plates 119b are configured to provide labyrinth-like passages communicating with the lower vent-holes 119a. The lower guard plates 119b are not limited in configuration to one described in this embodiment, and hence may have any configuration provided that the above blocking function can be achieved.

The top wall 123 has upper guard plates 123b disposed directly above the upper vent-holes 123a for preventing rainwater from entering the inside of the cover 60 through the vent-holes 123a. The upper guard plates 123b are configured to provide labyrinth-like passages communicating with the vent-holes 123a. The upper guard plates 123b are not limited in configuration to one described in this embodiment and hence may have any configuration provided that the above blocking function can be achieved.

The guard plates 119b, 123b may be omitted. Similarly, the vent-holes 119a, 123a may be omitted, in which case the cover 60 is designed in other ways to allow outside air to be taken into and discharged out of the cover 60 after cooling of the generator 90.

Air surrounding the generator 90 tends to move upward as it is heated by heat emitted from the generator 90. The generator 90 is vertically disposed as discussed above. Since the generator 90 is oriented in the same direction as the direction of flow of the heated surrounding air, the heat generated in the generator 90 is released upwardly out of the generator 90 with efficiency. The heat is then discharged through the upper vent-holes 123a out of the cover 60, as indicated by arrows. Meanwhile, as indicated arrows, outside air is introduced into the cover 60 through the lower vent-holes 119a and cools the generator 90, after which the air flows through the upper vent-holes 123a out of the cover 60.

As shown in FIG. 7, the upper part of the machine body 15 has the space 154, and the four mounting bosses 155 are disposed at the four corners of the upper surface 15a around the space 154 (see FIG. 5). The mount flanges 157 of the engine 18 are mounted on the mounting bosses 155 by the bolts 158.

The engine 18 has the right front mounting portion 111 to which the base portion 133 of the front mounting bracket 112 is attached by the bolts 134, 134, and the right rear mounting portion 114 to which the base portion 144 of the rear mounting bracket 115 is attached by the bolts 145, 145.

The front mounting bracket 112 has the projecting portion 135 attached to the front mount flange 138 of the generator 90 by the bolt 141. The rear mounting bracket 115 has the retaining portion 146 attached to the rear mount flange 139 of the generator 90 by the bolt 151.

With the bolt 141, 151 being loosened, the bolt 141 is movable within the guide opening 136 to thereby provide pivotal movement of the generator 90 on the bolt 151 for adjusting a tension in the drive belt 104.

Figure 8A:
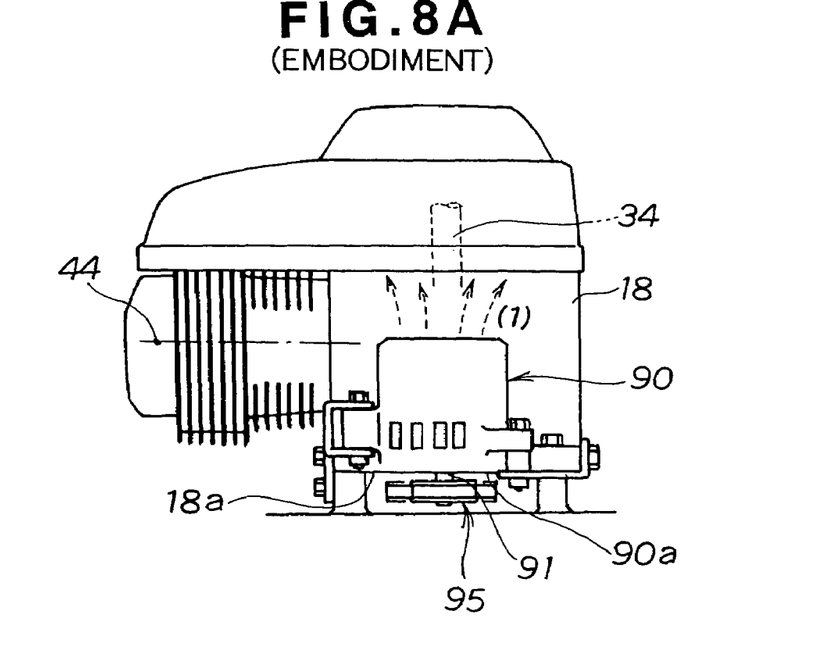
FIG. 8A is a schematic side view showing a positional relationship between the engine and the generator disposed according to the present invention.
Figure 8B:
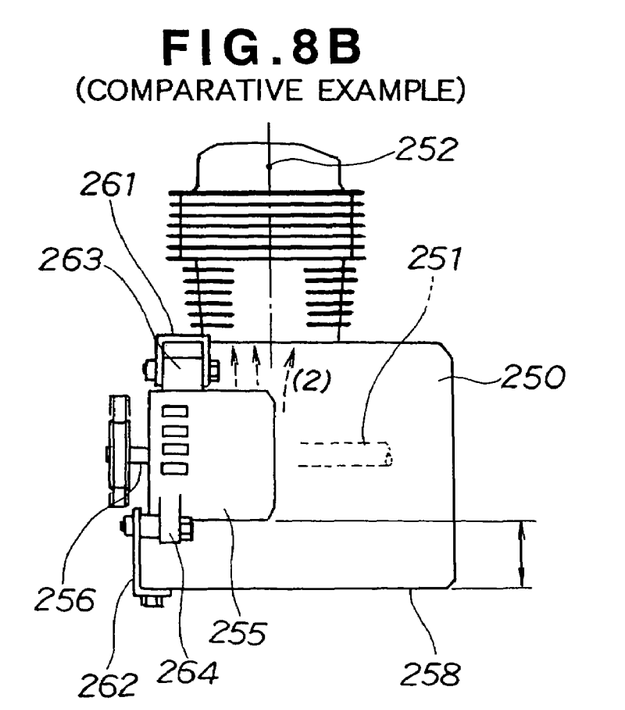
FIG. 8B is a view similar to FIG. 8A, showing a positional relationship between an engine and a generator according to a comparative example.

FIG. 8A shows the positional relationship between the engine 18 and the generator 90 disposed according to the present invention, and FIG. 8B shows the positional relationship between an engine and a generator according to a comparative example. As shown in FIG. 8A, the crankshaft (output shaft) 34 is vertically and downwardly disposed with the axis 44 of the cylinder 42 (FIG. 3) disposed horizontally, that is, in parallel to the ground surface 68 (see FIG. 1). The generator 90 is vertically disposed with the drive shaft 91 disposed vertically and downwardly.

Since the generator 90 is oriented in the same direction as the direction of flow of the heated surrounding air as discussed above, heat generated in the generator 90 can be smoothly released upwardly out of the generator 90, as indicated by arrows (1).

The heat thus released out of the generator 90 does not affect the upper cover member 62 because the generator 90 is spaced a given interval from the top wall 123, as previously discussed above with reference to FIG. 6.

The drive shaft 91 of the generator 90 extends vertically and downwardly from the lower end surface 90a of the generator 90 to a lower level than the lower end surface 18a of the engine 18 for connection to the crankshaft 34 through the power transmitting means 95. The generator 90 is positioned so low that the lower end surface 90a of the generator 90 lies substantially flush with the lower end surface 18a of the engine 18. This arrangement makes it possible to lower the center of gravity of the snow removing machine 10, thereby improving traveling stability of the machine 10.

As shown in FIG. 8B, the engine 250 has a crankshaft (output shaft) 251 disposed horizontally (that is, in parallel to the ground surface 68) and a cylinder having an axis 252 disposed vertically. The generator 255 has a drive shaft 256 disposed horizontally (that is, in parallel to the ground 68).

Since the generator 255 is horizontally disposed with the drive shaft 256 extending horizontally, heat generated in the generator 255 is released out of the generator 255, as shown by arrows (2).

In this instance, if the generator 255 is used for such a walk-behind working machine as a snow-removing machine having an engine for driving both traveling units and a working unit, the generator 255 is required to generate only a small amount of electric power for electrical accessories. Thus, the generator 255 generates only a small amount of heat, and such a small amount of heat can be readily released out of the generator 255 regardless of whether the generator 255 is disposed horizontally as shown in FIG. 8B or vertically as shown in FIG. 8A.

Alternatively, when the generator 255 is used for a snow-removing machine of the same type as the machine 10 having left and right electric motors for driving left and right traveling units, however, the generator 255 is required to generate large amount of electric power for driving the electric motors, which involves generation of a large amount of heat emitted from the generator. Such large amount of heat is difficult to release out of the generator 255 when the generator 255 is horizontally oriented as shown in FIG. 8B.

The crankshaft 251 of the engine 250 extends horizontally and rearward, and therefore the crankshaft 251 is disposed above a bottom surface 258 of the engine 250. The drive shaft 256 of the generator 255 is disposed in parallel to the crankshaft 251. The generator 255 has upper and lower mount flanges 263, 264 mounted through upper and lower mounting brackets 261, 262 to the engine 250.

If the generator 255 is displaced downwardly, the lower mount flange 264 would project downwardly to a level lower than the bottom surface 258 of the engine 250. In this case, there would be required additional space for accommodating the lower mount flange 264. Further, the drive shaft 256 of the generator 255 would be out of lateral alignment with the crankshaft 251 of the engine 250. This would make the mounting brackets 261, 262 complicated in configuration.

To avoid these problems, the generator 255 is disposed such that the lower mount flange 264 does not project to the lower level than the bottom surface 258 of the engine 250, as shown in FIG. 8B. Thus, the generator 255 is disposed above the bottom surface 258 of the engine 250. This arrangement undesirably leads to a higher center of gravity of the snow-removing machine.

Although the engine 18 drives the snow removing unit 20 and the electric motors 16, 17 drive the traveling units 11, 12 in the illustrated embodiment, the engine 18 may drive the traveling units 11, 12 and the electric motors 16, 17 may drive the snow removing unit 20.

Although the working unit has been described as a snow-removing unit, it may be otherwise a rotary tilling unit or the like. The generator 90 may be mounted on the left side of the engine 18 in the above-explained manner although the generator 90 is mounted on the right side of the engine 18 in the illustrated embodiment.

Obviously, various minor changes and modifications of the present invention are possible in the light of the above teaching. It is therefore to be understood that within the scope of the appended claims the invention may be practices otherwise than as specifically described.

What is claimed is:

1. A walk-behind self-propelled working machine comprising:
   a machine body;
   an engine disposed on the machine body and having an output shaft for providing a motive power;
   a generator having a drive shaft driven by the motive power to generate an electric power;
   power transmitting means for transmitting the motive power from the output shaft of the engine to the drive shaft of the generator;
   an electric motor driven by the electric power from the generator to produce a motive power;
   a traveling unit driven by the motive power from one of the engine and the electric motor to propel the working machine;
   a working unit driven by the motive power from the other of the engine and the electric motor for performing a work;
   the engine being vertically disposed with a cylinder disposed horizontally and the output shaft disposed vertically and downwardly;
   the generator being vertically disposed with the drive shaft disposed vertically and downwardly; and
   an axis of the drive shaft of the generator and an axis of the output shaft of the engine being disposed on a line extending perpendicularly to an axis of the cylinder as viewed in plan.

2. A walk-behind self-propelled working machine according to claim 1, wherein the working unit is disposed forwardly of the output shaft of the engine, the cylinder is disposed rearwardly of the output shaft of the engine, and the axis of the cylinder is disposed substantially in vertical alignment with a lengthwise centerline of the machine body.

3. A walk-behind self-propelled working machine according to claim 1, wherein the engine has a lower end surface and the generator has a lower end surface disposed substantially flush with the lower end surface of the engine.

* * * * *